PREPARATION OF STANNOUS CHLORIDE

David E. Hyatt, Arvada, Colo., assignor to Vulcan Materials Company, Birmingham, Ala.
No Drawing. Filed Nov. 16, 1971, Ser. No. 199,375
Int. Cl. C01g 11/08, 19/06
U.S. Cl. 423—494                 5 Claims

ABSTRACT OF THE DISCLOSURE

Stannous chloride is prepared in the form of the dihydrate by reacting tin metal, stannic chloride and an amount of water sufficient to form the dihydrate. The reaction is conducted at an elevated temperature, e.g., at the boiling temperature of the reaction mixture. Anhydrous stannous chloride may be obtained by dehydration of the dihydrate, as by drying it under reduced pressure.

BACKGROUND OF THE INVENTION

The present invention relates to a novel process for the preparation of stannous chloride by the chlorination of tin metal with stannic chloride.

Stannous chloride, $SnCl_2$, has been conventionally prepared by dissolving metallic tin in aqueous hydrochloric acid, and evaporating the solution until crystals of the dihydrate $SnCl_2 \cdot 2H_2O$, commonly known as tin salt, separate. This dihydrate loses its water and forms anhydrous stannous chloride when dried under reduced pressure. The anhydrous salt can also be made by heating metallic tin in a stream of gaseous hydrogen chloride. The use of aqueous hydrochloric acid presents serious corrosion problems.

It has also been proposed to prepare stannous chloride by the reaction of tin metal with chlorine gas in the presence of liquid stannic chloride, and a process of this type is shown in U.S. Pats. 810,455 and 1,030,110. Inasmuch as the use of chlorine in an aqueous system also presents severe corrosion problems, quite aside from the hazards normally attendant upon the use and handling of chlorine gas, it has been proposed to operate under anhydrous conditions, using organic solvents, and processes of this type are disclosed in U.S. Pats. 1,018,805 and 3,161,465.

A process currently employed commercially for the production of stannous chloride involves sparging chlorine gas into a reactor containing a concentrated aqueous solution of stannous chloride and hydrochloric acid in the presence of tin metal. Besides the corrosion factors previously mentioned, this method produces a high heat of reaction which under certain operating conditions can cause severe thermal shock to the reactor and results in cracks in glass-lined reaction vessels. Moreover, the process is not amenable to the production of high purity stannous chloride when a relatively low purity tin metal, such as Straits tin, is employed.

Among the more direct methods, the preparation of stannous chloride by the slow addition of chlorine to molten tin is possible but is difficult to control with regard to the simultaneous formation of stannic chloride.

The reaction of stannic chloride vapor with molten tin has favorable thermodynamic factors but is difficult to carry out in practice due to the fact that stannic chloride is a liquid at ordinary temperatures, having a melting point of $-30.2°$ C., and boils at $114°$ C., i.e., well below the melting points of metallic tin (M.P.=$232°$ C.) and of stannous chloride (M.P.=$246°$ C.). The alternative of refluxing mossy tin with anhydrous stannic chloride is also unsatisfactory owing to the low reactivity of anhydrous stannic chloride toward tin metal. The resulting extremely low yields, and the need to work under anhydrous conditions, have heretofore resulted in avoidance of the stannic chloride-tin metal reaction approach to the problem of preparing stannous chloride.

SUMMARY OF THE INVENTION

In accordance with the present invention, there is provided a novel process for the production of stannous chloride by the reaction of stannic chloride with metallic tin. It has been found, surprisingly and unexpectedly, that this reaction proceeds smoothly and with the production of stannous chloride of high purity and in high yields, when performed in the presence of water.

GENERAL DESCRIPTION OF THE INVENTION

According to this novel process water can be furnished to the reaction in either of two ways. According to one embodiment, about one mole of tin metal, about one mole of fuming or essentially anhydrous stannic chloride, and preferably at least four moles of free water are mixed and reacted according to the equation:

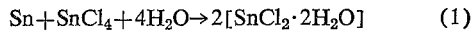
$$Sn + SnCl_4 + 4H_2O \rightarrow 2[SnCl_2 \cdot 2H_2O] \qquad (1)$$

In accordance with an alternative embodiment, one mole of tin metal is reacted with one mole of stannic chloride pentahydrate ("butter of tin") which acts as the source of the water required, according to the equation:

$$Sn + SnCl_4 \cdot 5H_2O \rightarrow 2[SnCl_2 \cdot 2H_2O] + H_2O \qquad (2)$$

In both embodiments, 4 moles of water and one mole each of tin metal and stannic chloride take part in the reaction. When substantially less than 4 moles, e.g., less than 3.5 moles, of water are present per mole of tin metal, the reaction tends to be impeded by the formation of solids on the tin metal surface. Anhydrous $SnCl_2$, possibly present in the absence of enough water to form the dihydrate, has a relatively high melting point ($246°$ C.) and may account for this solid formation. For this reason, water should be furnished to the reaction in a ratio of at least about 3.5 moles per mole of tin metal, a mole ratio of $4H_2O/1Sn$ being optimum if $SnCl_2$ dihydrate is the desired product. A $H_2O/Sn$ ratio higher than 4/1, e.g. 5/1 or even 7/1 or more is permissible, but ratios higher than 5/1 rarely if ever offer any advantage. However, the use of solid stannic chloride pentahydrate is often advantageous despite the one mole of excess water which this introduces into the system because the ease of handling the solid pentahydrate relative to fuming anhydrous liquid $SnCl_4$ can justify the cost of removing the excess water at the end of the process to obtain either $SnCl_2 \cdot 2H_2O$ or $SnCl_2$.

The yields of stannous chloride dihydrate are of the order of at least 95%, usually 96–97% of theory in either of the process embodiments described. More than 97%, e.g., 99% or more, of the tin metal is thus readily consumed in the process, and unreacted tin can be separated from the hot liquid reaction mixture by decanting the latter.

As the reaction on which this process is based is exothermic, it can be conveniently conducted at the boiling temperature of the reaction mixture, e.g., under reflux. However, if desired, extraneous heat may be added to further speed up the reaction. The reaction occurs readily at a temperature of $50°$ C. and higher and the reaction rate increase as tin is being rapidly consumed in the process and the temperature of the reaction mixture concomitantly rises to about 20–140° C., and higher if water is removed from the system (as in preparing $SnCl_2$ from $SnCl_2 \cdot 2H_2O$). Accordingly, the process can conveniently be carried out at temperatures in the range from between about $35°$ C. to about $250°$ C. or higher, preferably in the range from between $50°$ C. to about $150°$ C. under reflux with the addition of extraneous heat, and most preferably between about $110°$ C. and $140°$ C. when stannous chloride dihydrate is the desired product.

The stannous chloride dihydrate which is formed may be readily converted to anhydrous stannous chloride by removing the water of crystallization by evaporation under vacuum or other conventional drying procedures. The stannous chloride is useful as a mordant in dyeing, as a discharge agent in textile printing, in silvering mirrors, and as an intermediate for the production of stannous oxide or salts such as stannous sulfate or stannous oxalate.

The stannic chloride employed as a reactant, whether used in its anhydrous liquid form or as a hydrated solid, is preferably of high purity and may be prepared from tin metal by chlorination and distillation. The use of this high purity material makes possible the use of lower grades of tin metal from Malaya, Bolivia, or Nigeria since the impurities are diluted to a considerable extent by the pure tin available from the stannic chloride. Conservatively, impurity levels in the metallic tin used may run twice those specified for the stannous chloride product, as these impurities which are present in the tin are diluted (by $SnCl_4$ and to a lesser degree by the water) by a factor of 3 and 3.7 for $SnCl_2$ and $SnCl_2 \cdot 2H_2O$ respectively. While the relative importance of specific impurities will depend on the particular use for which the product is intended, arsenic, antimony, copper and iron frequently are of principal concern.

Accordingly, the process of the invention has several unique advantages. While the tin metal employed is advantageously of high purity electrolytic origin, and in a high surface area form (mossy tin), the cheaper and more readily available raw tin sources may also be utilized, depending upon the specifications of the stannous chloride product. Thus, while use of the stannous chloride in connection with food additives would require very low tolerances of copper or arsenic, miscellaneous industrial applications are possible where fewer restrictions are involved.

Moreover, the process of the invention is carried on under moderate conditions and the use of corrosive materials such as chlorine gas or hydrochloric acid is avoided, the stannic chloride being the sole required chlorinating agent.

DESCRIPTION OF THE PREFERRED EMBODIMENTS

The following examples will serve to illustrate the practice of the invention, but are not to be regarded as limiting. Proportions of materials are expressed on weight basis throughout this specification unless otherwise indicated.

Example 1

118.7 grams (1 mole) of mossy tin (having the analysis: Sn 99.9%; Sb 0.04% max.; As 0.003–0.007%; Pb 0.001–0.003%; Cu 0.0002%; Fe 0.003–0.004%; and S 0.0004%) is placed in a 500 ml. flask containing 260.5 grams (1 mole) of anhydrous stannic chloride (analysis: $SnCl_4$ 99.9%; Pb 0.0002%; Fe 0.0002%; Sb 0.0004%; As 0.0001%). The flask is fitted with a condenser and 72 grams (4 moles) of distilled water is added slowly to the flask through the condenser. An exothermic reaction ensues which, after being maintained at reflux for one hour, results in nearly complete consumption of the tin. The resultant liquid is decanted from the unreacted tin (about 1%) and cools to yield a solid mass of $SnCl_2 \cdot 2H_2O$. The yield is 97% based on the tin metal. The product analyzes 53.29% Sn(II) and 0.47% Sn(IV). The reaction takes place in accordance with the equation (1) shown earlier herein.

Example 2

The procedure of Example 1 is repeated using Straits tin having the analysis: Sn 99.891%; Sb 0.003%; As 0.038%; Pb 0.038%; Bi 0.008%; Cu 0.015%; Fe 0.005%; Co- Ni 0.002%. Similar results are obtained as in Example 1.

Example 3

175 grams of $SnCl_4 \cdot 5H_2O$ and 59.3 grams of mossy tin having the same analysis as in Example 1 are placed in a 500 ml. flask and heated to reflux for one hour. The resultant liquid to decanted from the unreacted tin (about 1%) and cools to yield a solid mass of stannous chloride dihydrate. The excess water (see equation) does not appear as a separate liquid phase. The yield of stannous chloride dihydrate is 96% and it is found to contain by analysis 53.27% Sn(II) and 0.00% Sn(IV). The reaction takes place in accordance with equation (2) shown earlier herein.

The invention is more particularly pointed out in the appended claims.

What is claimed is:

1. Process for the preparation of stannous chloride dihydrate which comprises:
    (a) charging elemental tin and stannic chloride in a molar ratio of essentially one to one into a reaction zone,
    (b) thereafter adding water to the reaction zone in an amount equal to from essentially 4 to 5 moles of water per mole of elemental tin,
    (c) mixing the tin, the stannic chloride and the water and maintaining the resulting mixture of tin, stannic chloride and water at an elevated temperature of between about 50° C. and 150° C. in the reaction zone until said mixture is converted into a liquid consisting essentially of a stannous chloride and water giving a product yield of at least 95% of theory in terms of stannous chloride dihydrate,
    (d) physically separating the hot stannous chloride-containing liquid from unreacted elemental tin,
    (e) cooling the hot liquid, and
    (f) recovering stannous chloride dihydrate.

2. The process of claim 1 in which the reaction is carried out at the boiling temperature of the reaction mixture while heating under reflux.

3. The process of claim 1 in which the molar ratio of $Sn:SnCl_4H_2O$ is essentially 1:1:4 and in which the reaction temperature is raised in the process to above 140° C. and water is removed therefrom, thereby converting the stannous chloride dihydrate formed to anhydrous stannous chloride.

4. Process for the preparation of anhydrous stannous chloride which comprises:
    (a) charging elemental tin and stannic chloride in a molar ratio of essentially one to one into a reaction zone,
    (b) thereafter adding to the reaction zone from essentially 4 to 5 moles of water per mole of elemental tin,
    (c) mixing the tin, the stannic chloride and the water and maintaining the resulting mixture of tin, stannic chloride and water at an elevated temperature between about 50° C. and 150° C. in the reaction zone until said mixture is converted essentially into molten stannous chloride dihydrate in a yield of at least 95% of theory,
    (d) physically separating the hot stannous chloride-containing liquid from unreacted elemental tin,
    (e) removing water of crystallization from the stannous chloride dihydrate and thus forming anhydrous stannous chloride, and
    (f) recovering the resulting anhydrous stannous chloride dihydrate.

5. Process for the preparation of stannous chloride dihydrate which comprises:
    (a) charging elemental tin and stannic chloride pentahydrate in a molar ratio of essentially one to one into a reaction zone, (b) maintaining the resulting mixture at a temperature between about 50° C. and 150° C. under reflux while heating until said mixture is converted into a liquid consisting essentially of stannous chloride and water giving a product yield of at least 95% of theory in terms of stannous chloride dihydrate,
(c) physically separating the hot stannous chloride-containing liquid from unreacted elemental tin,
(d) cooling the hot liquid, and
(e) recovering stannous chloride dihydrate.

References Cited
UNITED STATES PATENTS

| | | | |
|---|---|---|---|
| 810,455 | 1/1906 | Acker | 423—494 |
| 1,055,727 | 3/1913 | Doerflinger | 423—494 |
| 1,777,132 | 9/1930 | Smith | 423—494 |
| 1,825,212 | 9/1931 | Smith | 423—494 |
| 3,161,465 | 12/1964 | Horn et al. | 423—494 X |

FOREIGN PATENTS

| | | | |
|---|---|---|---|
| 284,141 | 3/1965 | Australia | 23—98 |
| 128,007 | 1960 | U.S.S.R. | 23—98 |
| 199,853 | 1967 | U.S.S.R. | 23—98 |

OTHER REFERENCES

Chemical Abstracts, vol. 54, No. 22, Nov. 25, 1960, 25638.

EDWARD STERN, Primary Examiner

U.S. Cl. X.R.

23—305; 423—89